Oct. 29, 1957　　　C. H. EWING　　　2,811,316

REVERSING CONTROL FOR FOOD WASTE DISPOSER

Filed May 19, 1954　　　2 Sheets-Sheet 1

INVENTOR
CLIFTON H. EWING

BY R. J. Eisinger
ATTORNEY

Oct. 29, 1957 C. H. EWING 2,811,316
REVERSING CONTROL FOR FOOD WASTE DISPOSER
Filed May 19, 1954 2 Sheets-Sheet 2

INVENTOR
CLIFTON H. EWING
BY R. J. Eisinger
ATTORNEY

United States Patent Office 2,811,316
Patented Oct. 29, 1957

2,811,316

REVERSING CONTROL FOR FOOD WASTE DISPOSER

Clifton H. Ewing, Easthampton, Mass., assignor to Westinghouse Electric Corporation, East Pittsburgh, Pa., a corporation of Pennsylvania Application May 19, 1954, Serial No. 430,760

4 Claims. (Cl. 241—32.5)

This invention relates to an improved control for reversing the direction of rotation of a food waste disposer.

In food waste disposers of the type shown herein, certain waste may cause jamming of the grinding mechanism. In order to release the jammed mechanism, it is sometimes necessary to reverse the rotation of the motor. It is desirable to incorporate some easily and conveniently manipulated control for effecting reverse rotation to overcome jamming. Since reversible disposers have different grinding surfaces operative when the motor operates in each direction, the surfaces can be made to wear evenly to prolong their life by periodically reversing the rotation of the disposer. For this purpose, also, it is desirable to have a simple and convenient reversing control.

One object of this invention is to provide a convenient, manually operable means for controlling the normal operation of a food waste disposer and in which the operator may select, for each successive period of operation, the desired direction of rotation of the motor by properly manipulating the manually operable means.

Another object of this invention is to provide a reversing switch for switching the starting winding while the motor is not energized, so as to permit the use of less expensive reversing contacts.

A further object of this invention is to provide means whereby the above objects may be accomplished through the operation of a single manually operable closure and control member in the food waste receiving opening of the disposer.

Apparatus incorporating this invention includes a manually operable closure and control member mounted in the waste receiving opening of a food waste disposer. A switching mechanism is adapted to be operated by the control member so that, by manually moving only the control member, the disposer motor is connected to operate in the direction selected by the user before each successive period of energization.

The switching mechanism includes a main switch which is closed for each operation of the disposer to connect the motor to a suitable power source. This mechanism can also reverse the connections to one of the motor windings by shifting a series of bridging contacts with respect to a series of fixed contacts. Although the main switch is closed each time the motor is energized, the direction of motor rotation is reversed only when desired by the user.

These and other objects are effected by the invention as will be apparent from the following description taken in connection with the accompanying drawings, forming a part of this application, in which.

Figure 10:
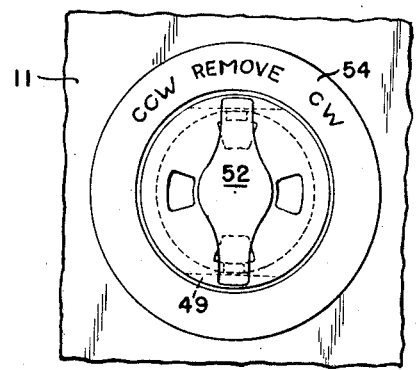
Figure 11:
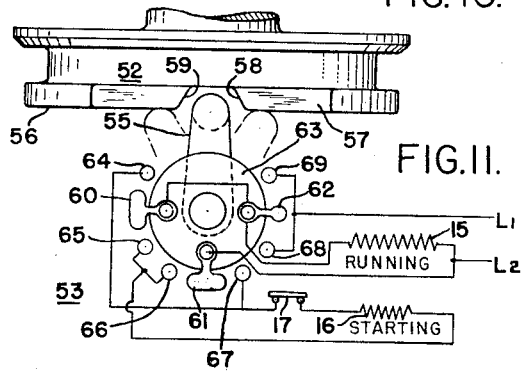
Figure 12:
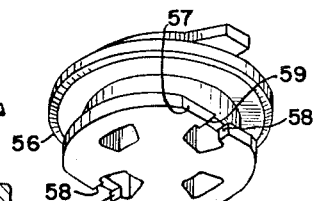
Figures 9A, 9B, 9C:
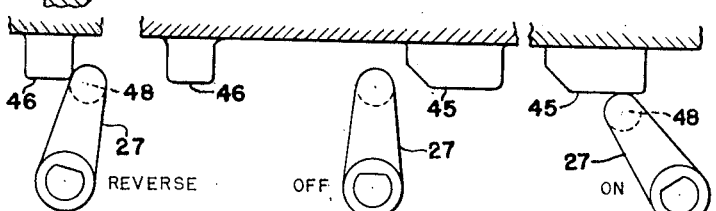

Figs. 9a, 9b, and 9c are developed views of the operating crank in its various operative positions, showing the positions of the cam portions on the closure member relative the crank;

Fig. 10 is a plan view of another embodiment of a food waste disposer, as seen looking into the sink;

Fig. 11 is a diagrammatic view of the embodiment shown in Fig. 10, showing a portion of the control member and the operating crank in elevation; and Fig. 12 is a perspective view of the control member shown in Figs. 10 and 11.

Figure 1:
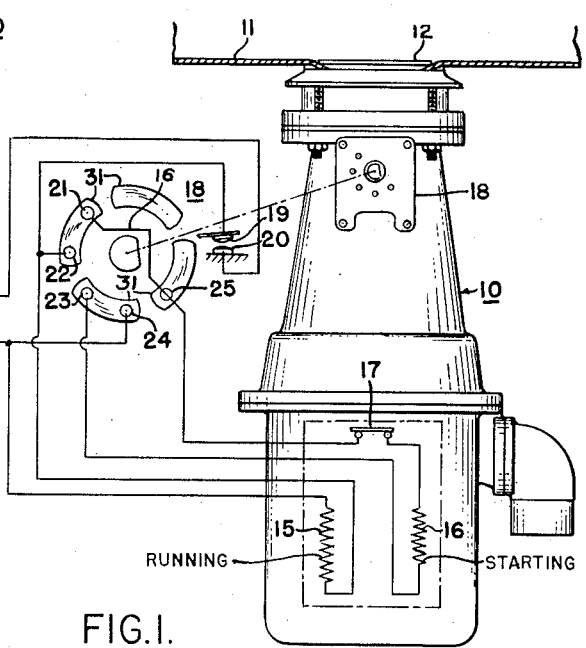
Fig. 1 is an elevation of a food waste disposer mounted in registry with a sink drain opening, and showing diagrammatically the windings and the control circuit for the disposer motor.
Figure 5:
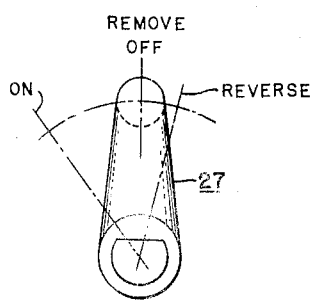
Fig. 5 is a front elevation of the operating crank in its normal position, the same as in Figs. 3 and 4, and with its other operative positions indicated.

Referring to Fig. 1 of the drawing, a food waste disposer 10 is shown mounted in registry with the drain opening in the bottom portion of a sink 11. The food waste disposer is supported by an annular flange member 12, which forms the upper portion of the disposer housing 13 and is provided with an opening or throat portion 14 to receive water and food waste passing through the drain opening of the sink.

Food waste received by the disposer is finely ground by a suitable comminuting mechanism (not shown) and washed away by means of water flow through the disposer.

The comminuting mechanism may be driven by a reversible motor of any type. The embodiments of my invention shown in the accompanying drawings and described herein incorporate a split phase alternating current motor having both a running winding 15 and a starting winding 16. The motor may be reversed by reversing the connections to the starting winding with respect to the running winding. Any suitable type of starting relay or centrifugal switch 17 may be used to disconnect the starting winding after the motor is started.

The electrical circuit for the first embodiment of my invention is also shown in Fig. 1. Conductors $L_1$ and $L_2$ represent a conventional source of power to which the windings of the disposer motor may be connected by a switching mechanism 18. The latter includes a main switch having contacts 19 and 20 which are adapted to disconnect both windings from the line conductor $L_1$, and it further includes a reversing switch, having contacts 21 through 25, which is adapted to reverse the connections of the starting winding 16 with respect to the running winding 15.

Contact 23 is connected to one terminal and contacts 21 and 25 are connected to the other terminal of the starting winding. The alternate or intervening contacts 22 and 24 are connected to the terminals of the running winding as well as line conductors $L_1$ and $L_2$, respectively. In the position shown in Fig. 1, contact 21 is connected to contact 22 and contact 23 is connected to contact 24, connecting the windings in one relation. When the bridging members are rotated to one of the alternate positions, the contact 25 is connected to the contact 24 and the contact 23 is connected to contact 22, thereby connecting the starting winding 16 in the reversed relation to the running winding 15, as well as to the conductors $L_1$ and $L_2$. Thus, the direction in which the motor will rotate when the contacts 19 and 20 are closed may be reversed.

Figure 2:
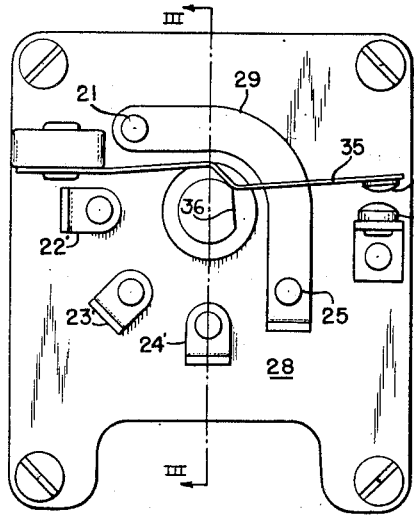
Fig. 2 is a front elevation of the control switch mechanism.
Figure 3:
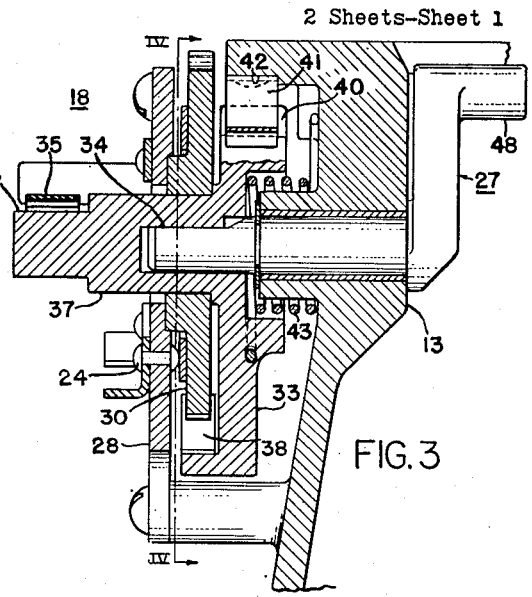
Fig. 3 is a vertical section of the control switch mechanism, taken along line III—III of Fig. 2, and showing some additional structure.
Figure 4:
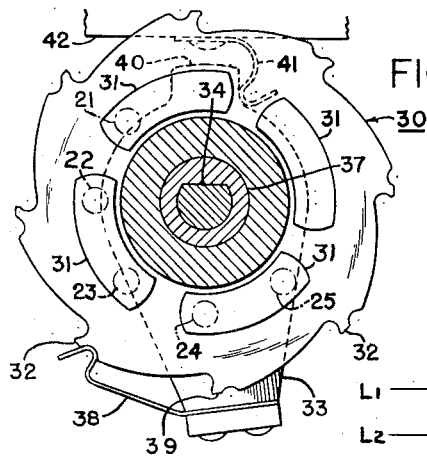
Fig. 4 is a section of the control switch mechanism taken along line IV—IV of Fig. 3.
Figure 7:
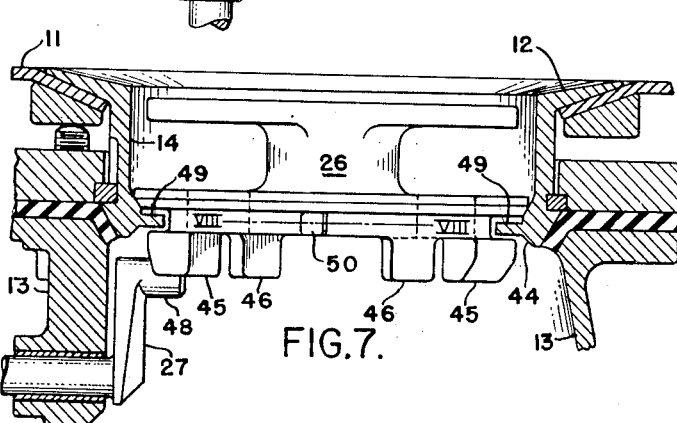
Fig. 7 is a vertical section drawn to larger scale and taken along line VII—VII of Fig. 6, with the operating crank and the closure member in full lines as seen from line VII—VII of Fig. 8.

A manually operated closure and control member 26 is supported in the throat portion 14 of the disposer housing as seen in Fig. 7 and is adapted when rotated in either direction to move a switch operating crank 27 which, in turn, is connected to operate the switching mechanism 18, shown mounted on the disposer in Fig. 1 and in detail in Figs. 2 through 4, to control operation of the reversible motor.

Figure 6:
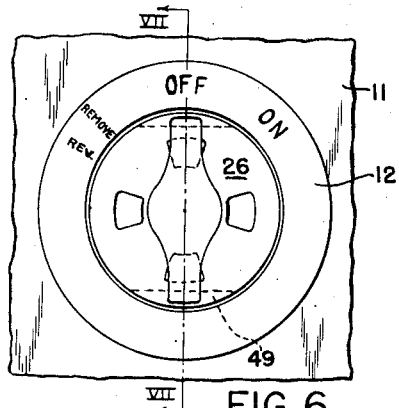
Fig. 6 is a plan view of the food waste disposer as seen looking into the sink.

The control member 26 may be inserted and removed from its position in the throat portion 14 when the handle of the control is aligned with the indicium shown in Fig. 6 which indicates the "remove" position. The control member when inserted may be rotated clockwise from the "remove" position through the "off" position to the "on" position, in which the motor is energized through the closure of the main switch. When the control member is returned to the "off" or the "remove" position the main switch is opened. The control member may also be moved counterclockwise from the "remove" position to the "reverse" position and then clockwise to the "on" position to effect shifting of connections to the starting winding and closure of the main switch to connect the motor for operation in the opposite direction.

The switching mechanism 18 as shown in Fig. 2 through Fig. 4 is in an unoperated or normal position in which the arm of the operating crank 27 remains substantially vertical. This position is assumed when the control member is in the "off" or the "remove" position indicated by the indicia in Fig. 6. When the control member is moved clockwise to the "on" position it moves the operating crank 27 counterclockwise to its on position as shown in Fig. 9c. In moving the control member counterclockwise to the "reverse" position, the operating crank 27 is moved clockwise to its reverse position indicated in Fig. 9a. Suitable cam means are provided on the control member to effect movement of the operating crank 27 and these will be discussed in detail below after the explanation of the operation of the switch mechanism 18 in response to movement of the operating crank 27.

The switch mechanism 18 includes a contact supporting plate 28 of suitable insulating material spaced from, but supported by, the upper wall 13 of the disposer housing. The fixed contacts 21 through 25 are equally spaced at 45° intervals in an arcuate path, concentric with the shaft of crank 27, on the rear of plate 28. The fixed contacts are provided with electrically conducting pins which extend through plate 28 and are connected to terminal members on the face of plate 28. Contacts 22, 23 and 24 are connected to terminal members 22', 23' and 24' respectively, whereas contacts 21 and 25 are connected to a single bridge terminal member 29.

Next to plate 28 is a rotatable ratchet wheel 30 carrying the uniformly spaced arcuate bridging contacts 31, which may be rotatably moved in 45° steps into engagement with certain pairs of the fixed contacts 21 to 25. The ratchet wheel is provided with teeth 32 spaced uniformly at 45° intervals around its periphery.

The shaft of crank 27 is rotatably supported in a bearing in the upper wall 13 of the disposer housing. An actuator 33, for operating the ratchet wheel and the main switch, is supported by the outer end of the crank shaft and is keyed for rotation therewith by means of the flat shaft portion 34 shown in Figs. 3 and 4.

The main switch contacts 19 and 20 are supported on the plate 28. The contact 20 is fixed to the latter, whereas the movable contact 19 is supported on the plate 28 by means of a conducting spring arm 35 which biases the contacts to the closed position. The end of the actuator shaft remote from the crank 27 extends through the plate 28 and is provided with a camming surface 36 which engages the switch arm 35, as seen in Fig. 2, to operate the main switch. When the control member 26 is moved to the "on" position indicated in Fig. 6, this camming surface 36 is moved to permit the spring arm to close contacts 19 and 20 to energize the disposer motor.

The ratchet wheel 30 is supported by the shaft 37 of the actuator and is free to rotate with respect thereto and concentrically with the shaft of crank 27. A spring pawl 38 is attached to the actuator 33 and is biased into engagement with the periphery of the ratchet wheel 30. The pawl 38 cooperates with the teeth 32 of the ratchet wheel to provide unidirectional step by step rotation of the ratchet wheel. Each step of rotation is effected by moving the actuator clockwise, as seen in Fig. 4, to engage the pawl 38 with one of the teeth 32 and then moving the actuator counterclockwise to rotate the ratchet wheel through an angle of 45°.

Suitable friction means are provided to prevent rotation of the ratchet wheel 30 with respect to the plate 28 except when one of the teeth 32 is engaged by the spring pawl 38. During normal movement of the control member between its "remove" and "on" positions, the crank 27 moves between its off and on positions, in which range the spring pawl 38 slides over the peripheral surface of the ratchet wheel 30 between the position of the pawl shown in Fig. 4 and the position it assumes when moved counterclockwise to a position adjacent the lowermost tooth 39 on the ratchet wheel, but without moving the latter.

To limit the normal clockwise movement of the actuator 33, a projection 40 on the actuator 33 engages a leaf spring 41, which is attached to a flange 42 on the upper wall portion of the disposer housing. The projection 40 is biased in clockwise direction, as viewed in Fig. 4, into engagement with leaf spring 41 by a helical spring 43, which encircles the crank shaft. The spring 43 has one end secured to the housing 13 and its other end anchored to the actuator 33. The leaf spring 41 is of sufficient strength to prevent clockwise movement of projection 40, when the actuator 33 is influenced only by the spring 43, beyond a point corresponding to the normal position of the crank 27. Thus, the springs 41 and 43 always cause the crank 27 to return to the normal or off position when no forces are applied to the crank by the control member 26.

Referring to Fig. 7, the annular flange member 12, which serves to support the disposer unit in the sink opening, is provided with an annular rib 44 forming a seat for the control member 26. The control member has attached to its lower peripheral edge two diametrically opposite cam members 45, one of which engages crank pin 48 for operating the crank 27 to its on position when the control member is moved clockwise to the "on" position. Spaced approximately 90 degrees from the cam members 45 on the control member are two diametrically opposite cam members 46, one of which engages crank pin 48 to actuate the crank 27 to its reverse position when the control member is moved to its "reverse" position in counterclockwise direction.

The control member 26 is constructed so that the cam members 45 extend beneath two diametrically opposed web portions 49, attached to the inner diameter of the annular rib 44, when the control is in either the "off" or the "on" position, as indicated in Fig. 6, so that it cannot be withdrawn from its position in the annular member 12 without first returning it to the "remove" position. The reversing cams 46, however, never extend beneath the web portions 49. The control is symmetrically shaped, so that if it is removed from the disposer unit and rotated 180° and reinserted, it will function in exactly the same manner.

Figs. 9a, 9b, and 9c show the relative positions of the cams 45 and 46 with respect to the crank 27 when the control member is in the "reverse," "off" and "on" positions, respectively.

The forward face of the cam member 45, which abuts the crank 27 when the control member is moved in clockwise direction to the "on" position, is sloped so that the cam forces the crank pin 48 down and under the rear portion of the cam 45 to the position shown in Fig. 9c. The reversing cams 46 are provided with relatively vertical faces which engage the crank pin 48 and move it clockwise (as seen in Fig. 9a) when the control member is moved to its "reverse" position.

Figure 8:
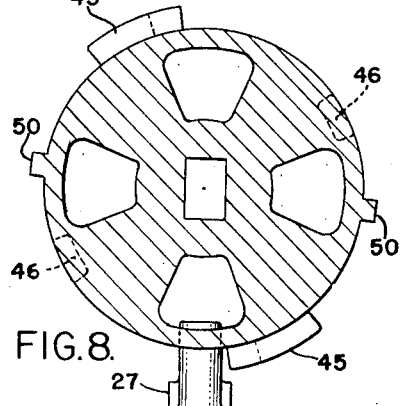
Fig. 8 is a sectional view of the closure member taken on the horizontal plane indicated by the line VIII—VIII of Fig. 7.

To limit the rotation of the control member, a stop lug 50 is shown in Figs. 7 and 8 attached thereto in a position to engage the webs 49 when the control member is rotated to the "on" and "reverse" positions.

The bridging contacts 31 extend for sufficient distance along their arcuate paths that during each 45° step in the movement of the ratchet wheel 30, the switching of the bridging contacts to different pairs of stationary contacts on plate 23 is completed before the contacts 19 and 20 are closed.

The operation of the first embodiment may be best explained by referring to Figs. 6 and 9. When the control member is moved to the "remove" position, it may be removed from the disposer unit to permit the insertion of food waste, after which the control member is reinserted with the handle in the "remove" position. The control member is rotated clockwise to the "on" position to start the disposer motor. During the running of the disposer unit, water is run in the sink and through the disposer to carry off the fine comminuted particles of food waste.

When the control member 26 is moved to the "on" position, the crank extension 48 is forced down and under the lower horizontal surface of cam 45 as in Fig. 9c. There is no tendency for the control member to be rotated under the influence of the crank and thus the crank is maintained in the on position until the control member is manually moved from the "on" position. When the control member 26 is moved counterclockwise (see Fig. 6) from the "on" position the cam 45 moves out of engagement with the crank pin 48 and with the assistance of spring 34 the crank returns to its vertical or off position in which the projection 40 on the actuator abuts the spring 41. The control member may be freely rotated until it reaches the "remove" position at which time the cam 46 engages the pin 48 on crank 27. Further movement of the control member and crank is resisted by the force of the spring 41 on the actuator projection 40. If the control member is again moved clockwise from the "remove" to the "on" position, the motor will operate in the same direction as during its previous period of energization.

If, because of jamming or otherwise, it is desired to reverse the operation of the motor during the next period of energization, it is necessary to first move the control member counterclockwise beyond the "remove" position to the "reverse" position. This requires a positive additional force exerted through cam 46 on the crank pin 48 to overcome the force of the spring 41. This movement causes the crank 27 to move the actuator 33 in clockwise direction as seen in Fig. 4, whereby the spring pawl 38 passes over and catches behind one of the teeth 32. The following clockwise movement of the control member to the "on" position effects rotation of the ratchet wheel 30 through an angle of 45 degrees to shift the bridging contacts 31, and toward the end of this latter movement the contacts 19 and 20 are closed to energize the motor.

The 45 degree rotation of the bridging contacts mounted on the ratchet wheel 30 is effected only when desired by the operator, whereas the main line switch contacts 19 and 20 are closed each time the control member is moved to the on position.

Another embodiment of this invention is shown in Figs. 10, 11 and 12. In this embodiment a manually operated closure or control member 52 is adapted to control a switching mechanism 53 when it is positioned within an annular flanged member 54, which supports the disposer in registry with an opening in the sink 11.

Upon rotating the control member 52 clockwise from its "remove" or off position, indicated in Fig. 10, the switching mechanism is actuated to connect the disposer motor for operation in one direction. However, upon rotating the control counterclockwise from the "remove" position, the motor is connected for operation in the opposite direction.

The annular flanged member 54 is identical with the flanged member 12 of the first embodiment of the invention, shown in Figs. 6 and 7, except for the indicia provided thereon.

The control member 52, shown most clearly in Fig. 12, is adapted to be inserted in the throat of the flanged member 54, and is rotatable therein to actuate a switch operating crank 55. The crank 55 may be supported in the disposer housing in a manner similar to crank 27 in the first embodiment as shown, for example, in Fig. 7. The lower face of the control member 52 is extended radially to form a flange 56. The flange 56 has two diametrically opposite flat portions 57 which permit the flange 56 to be moved past the webs 49 in the flanged member 54 when the control member is in the remove position as shown in Fig. 10.

The lower face of the control member 52 is cut away at the middle of the flat portions 57 to form opposite cam surfaces 58 and 59. The cam surfaces 58 and 59 straddle the end of the switch operating crank 55, as shown in Fig. 11, when the control member is in the "remove" position, to which the crank 55 is biased. When control member is rotated clockwise from the "remove" position, the end of crank 55 is engaged by the cam surface 58 and the crank is moved counterclockwise. Similarly, when the control member is rotated counterclockwise, the crank is engaged by the cam 59 to move the crank in clockwise direction. When the control member is rotated from its "remove" position, portions of the flange 56 will be moved beneath the webs 49 to prevent removal of the control member from the flanged member 54 and also to hold the control member against the upward force exerted on the lower surface of the flange by the crank when in its operating position.

To limit the angular rotation of the control member to the range indicated by the indicia shown on the flange member 54 in Fig. 10, a stop, similar to the lug 50 shown in Figs. 7 and 8, which will engage one of the webs 49, may be provided on the upper surface of the flange 56.

Although two sets of cam surfaces are shown at opposite sides of the flange 56, only one set cooperates with the crank 55 at any one time. The second set effects the same operation when the control member 52 is reinserted after being removed and rotated 180°.

The switching mechanism and circuit connections for the second embodiment of my invention are shown in Fig. 11. Each change in direction of motor operation is effected by reversing the connections to the motor starting winding 16 without changing the connections to the running winding 15.

The switching mechanism comprises a triple pole, double throw switch. The movable switch contacts 60, 61 and 62 are supported by an insulating plate 63 which is connected outside of the disposer housing to the shaft of crank 55 for rotation therewith.

The motor running winding 15 is connected to conductors L₁ and L₂, which represent a conventional power source, by moving contact 62 into engagement with either fixed contact 68, upon clockwise movement of crank 55, or fixed contact 69, upon counterclockwise movement of crank 55. Fixed contacts 68 and 69 are connected to conductor L₁. Inasmuch as one end of the running winding is always connected to contact 62, and the other end is connected to conductor L₂, the running winding will always be connected with the same polarity with respect to conductors L₁ and L₂, regardless of the direction of movement of crank 55 and contact 62.

The starting winding is also adapted to be connected between contact 62 and conductor L₂. However, the connections to the starting winding when the crank is moved clockwise are reversed with respect to the connections which are made when the crank is moved counterclockwise.

One end of the starting winding is connected directly to fixed contacts 65 and 66 and the other end of this winding is connected through a starting relay 17 to fixed contacts 64 and 67.

When the crank 55 is moved clockwise, movable contact 60, which is connected to contact 62, engages fixed contact 64, and movable contact 61, which is connected to conductor L₂, engages fixed contact 66. The motor will then rotate in one direction. The starting winding circuit may be traced from conductor L₁, fixed contact 68, movable contact 62, movable contact 60, fixed contact 64, starting relay 17, starting winding 16, fixed contact 66, movable contact 61, to conductor L₂. When the crank 55 is rotated counterclockwise the movable contacts 60 and 61 engage fixed contacts 65 and 67 respectively and the connections to the starting winding are reversed.

The movable contacts 60 and 61 are so constructed that, during angular movement of the crank 55, they engage their respective fixed contacts to connect the starting winding before the movable contact 62 engages either fixed contact 68 or 69 to energize the whole circuit.

It is apparent from the foregoing description that in both embodiments of my invention shown, the disposer is operated when the control member is turned in one direction (clockwise as seen in Figs. 6 and 10) from the remove position. The switching means of both embodiments are conditioned for reverse operation of the motor when the control member is moved in the other direction from the remove position, that is, the switching means may be connected for reverse operation only by moving said control member counterclockwise from the remove position. It is noted, however, that in the first embodiment, the second step of moving the control member to the on position, after conditioning said switch means for reversed operation of the motor, is necessary to operate the motor in the reverse direction.

The "off" position in the first embodiment may be utilized when it is desired to close the opening 14, as for utilizing the sink to wash dishes. Suitable mechanism for closing the openings in the control and closure member 26 is well known in the art but it has been omitted on the drawings, since it forms no part of the present invention. In either embodiment the sink opening may be closed by placing a rubber disc stopper over the opening.

While the invention has been shown in several forms, it will be obvious to those skilled in the art that it is not so limited, but is susceptible of various other changes and modifications without departing from the spirit thereof.

What is claimed is:

1. A food waste disposer comprising a housing having an open throat portion to receive food waste, a reversible motor for operating a comminuting mechanism within in said housing, switching means for controlling the circuit connections to said motor, a manually rotatable control member supported in said throat portion for operating said switching means, said control member having a first position in which said motor is deenergized, said control member having a second position in which said motor is energized for rotation in a first direction, said switching means being operable to connect said motor for rotation in said first direction during successive periods of energization when said control member is moved between said first and second positions, said control member having a third position to which it may be moved at the will of the operator to change the direction of rotation effected thereafter during subsequent periods of energization which are determined by movement of said control member between said first and second positions.

2. A food waste disposer comprising a housing provided with an open throat portion to receive food waste, a reversible motor adapted to operate a comminuting mechanism within said disposer, switching means for controlling the circuit connections to said reversible motor, a manually rotatable control member adapted to be supported in said throat portion, said control member being movable between a first position in which said motor is deenergized and a second position in which said motor is energized, said control member being movable to a third position outside of the range of movement between said first and second positions to reverse the direction of motor rotation subsequently to be effected by said switching means, said switching means, upon actuation thereof by movement of said control member from said first to said second position, effecting operation of the motor in the direction determined by the last movement of the control member to said third position.

3. A food waste disposer comprising a housing having an open throat portion to receive food waste, a reversible motor for operating a comminuting mechanism within said housing, switch means for controlling the circuit connections to said motor, a manually rotatable control member supported in said throat portion, a switch operating member between said control member and said switch means, spring means for biasing said operating member to a first position, said operating member being movable in one direction by said control member to a second position to actuate said switch means to connect said motor for rotation in a first direction, said operating member being movable by said control member from said first position in the opposite direction to a third position in which said switching means is adjusted to change the direction of rotation of said motor effected during subsequent movements of said operating member between said first and second positions.

4. A food waste disposer comprising a housing having an open throat portion to receive food waste, a reversible motor for operating a comminuting mechanism within said housing, switch means for controlling the circuit connections to said motor, a manually rotatable control member supported in said throat portion, a switch operating member between said control member and said switch means, a contact carrying ratchet wheel, a pawl operated by said operating member to unidirectionally rotate said wheel, a first set of contacts on said wheel, a second set of contacts cooperating with said first set of contacts to connect said motor for rotation in a direction dependent upon the position of said wheel, spring means for biasing said operating member to a first position, said operating member being movable in one direction by said control member from said first position to a second position to actuate said switch means to connect said motor for rotation in a first direction, said pawl being ineffective to rotate said wheel during the movement of said operating member from said second position to said first position and during succeeding movement of said operating member between said positions provided said member has not moved beyond said first position in the opposite direction, said operating member being movable by said control member from said first position in said opposite direction to a third position in which said motor is deenergized and said pawl engages said ratchet wheel in driving relationship, said pawl moving said wheel and said first set of contacts relative said second set of contacts to reverse the direction of motor rotation each time said operating member is moved in said one direction by said control member from said third to said second positions, said motor operating in the same direction during subsequent movements of said operating member between said first and second positions provided said operating member is not moved to said third position.

References Cited in the file of this patent

UNITED STATES PATENTS

| | | |
|---|---|---|
| 2,225,171 | Hammes | Dec. 17, 1940 |
| 2,244,402 | Powers | June 3, 1941 |
| 2,678,775 | Simmons | May 18, 1954 |
| 2,701,855 | Hammes | Feb. 8, 1955 |